Feb. 11, 1947.   U. J. BROWN   2,415,576
ELECTROCHEMICAL SCALE REMOVER AND SCALE AND CORROSION PREVENTER
Filed Jan. 16, 1943

INVENTOR
Ual J. Brown.
BY
Arthur C. Brown
ATTORNEY

UNITED STATES PATENT OFFICE 2,415,576

ELECTROCHEMICAL SCALE REMOVER AND SCALE AND CORROSION PREVENTER

Ual J. Brown, Oklahoma City, Okla.

Application January 16, 1943, Serial No. 472,590

2 Claims. (Cl. 204—248)

This invention relates to scale removers including corrosion and scale preventers for water heaters, boilers, and the like, and more particularly to an electro-chemical device for preventing corrosion and for removing scale formation on the tubes, walls and other metal parts of the heating equipment having contact with the water therein and to generally condition water for boiler and hot water systems.

I have found that the provision of a device consisting of two dissimilar metals, such as copper and zinc, and immersing the same in the water in a heater creates a small electrical current that precipitates the minerals and salts therein.

I have also found that for proper operation of such a unit, it is necessary that the unit be kept free of sludge to maintain a full circulation of the water between the dissimilar metals. This is for the reason that the principal precipitations are effected in the water as it passes through the electrical field created by the dissimilar metals above mentioned.

The principal object of the present invention is, therefore, to provide a device of this character in which two dissimilar metals are immersed in the water in spaced relation to establish an electrical current to effect precipitation and neutralization of scale forming particles.

Other objects of the invention are to provide a scale prevention device in which a sacrificial metal, preferably zinc, is supported in a barrel of dissimilar metal, preferably copper; to provide for supporting the sacrificial metal, such as zinc, in a barrel of dissimilar metal and in spaced condition therefrom to permit free and full circulation of the water therethrough; to provide for supporting a sacrificial metal in a housing of the unit without any expansion or contraction strain on the sacrificial metal; to provide for protecting the ends of the sacrificial metal from washing effects of the circulating water; to provide for maintaining an electrical connection between the dissimilar metals in the scale prevention unit; to provide a scale prevention unit which creates an electrical current and so treats the water passing therethrough that the scale on the metal parts of the heater mechanism is dissolved and removed; to provide for supporting the sacrificial element in a scale prevention device in such a manner that buckling of the element is prevented; to provide a corrosion and scale preventer of this character which is simple in construction, reliable and efficient in operation, strong, durable and economical to manufacture; and to provide improved elements and arrangements thereof in a corrosion and scale preventer of the character described.

In accomplishing these and other objects of the present invention, I have provided improved details of structure, the preferred form of which is illustrated in the accompanying drawing, wherein.

Figure 1:
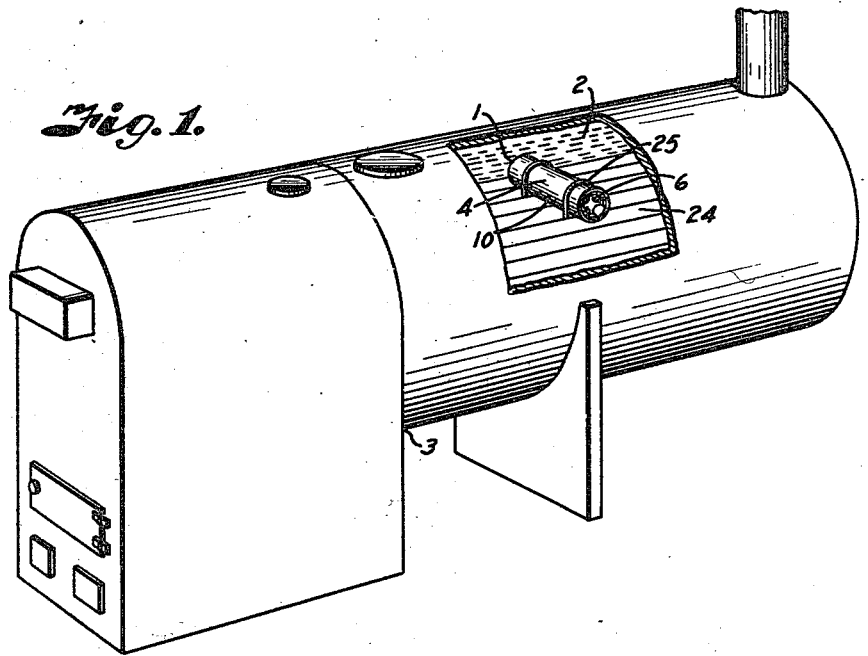
Fig. 1 is a perspective view of a boiler, portions of which are broken away to illustrate the location of a scale preventer embodying the features of the present invention therein.
Figure 2:
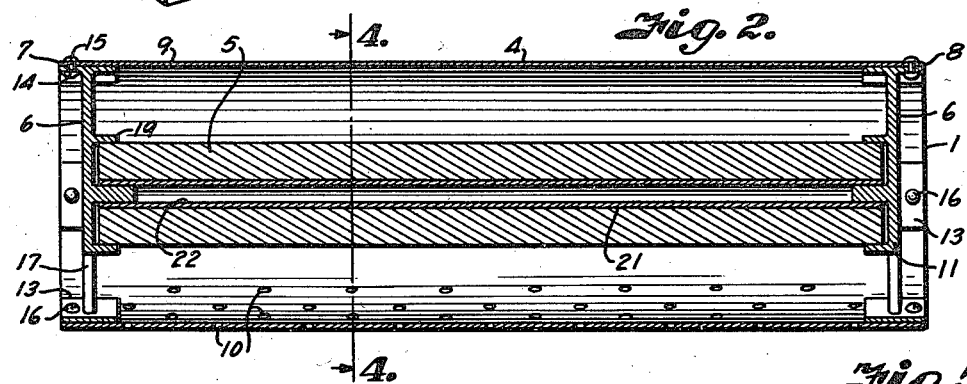
Fig. 2 is a longitudinal sectional view of a corrosion and scale preventer embodying the features of the present invention.
Figure 3:
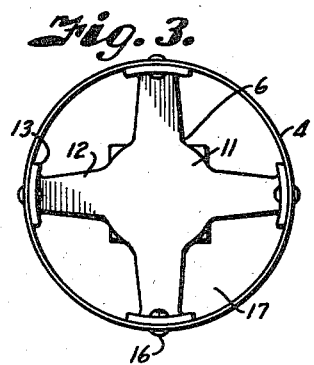
Fig. 3 is an end elevation of the scale prevention unit.
Figure 4:
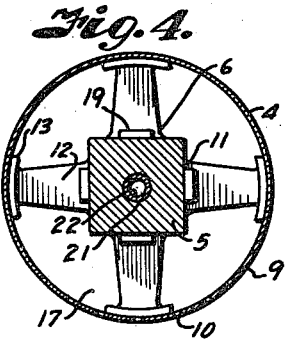
Fig. 4 is a vertical sectional view through the barrel and sacrificial element on the line 4—4, Fig. 2.
Figure 5:
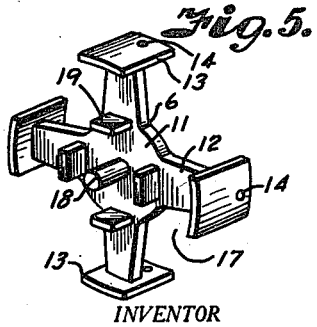
Fig. 5 is a detail perspective view of the end member of the scale preventing unit, particularly illustrating the means for supporting the sacrificial element.

Referring more in detail to the drawing:

1 designates a corrosion and scale prevention device consisting of dissimilar metals adapted to be immersed in the water 2 of a boiler or water heater 3. The corrosion and scale prevention device preferably consists of a copper barrel 4 and a sacrificial element of zinc or the like 5, supported in the barrel in spaced relation thereto by spiders 6 which are preferably located adjacent the ends of the barrel. The barrel of the scale prevention device preferably consists of a tubular member open at the ends 7 and 8 and having its wall 9 of relatively thin copper, said barrel preferably having a plurality of holes or apertures 10 in the lower portion thereof for a purpose later described.

Located adjacent each end of the barrel are the spiders 6 which preferably consist of brass casting having central disc-shape members 11 provided with legs 12 extending outwardly from said disc at opposite diametrical points thereon and terminating in feet 13 adapted to engage the inside of the wall 9 of the barrel 4, said feet being provided with apertures 14 adapted to align with apertures 15 in the barrel to receive rivets or other fastening means 16 for securing the spiders in place. The legs of the spiders preferably are four in number and relatively narrow to provide openings 17 therebetween to permit free access to the interior of the barrel. Projecting inwardly from the disc 11 are centrally located pins 18 which cooperate with inwardly extending flanges 19 spaced radially therefrom to support the sacrificial element 5 in the barrel.

The sacrificial element 5 preferably consists of cast or rolled zinc of such length that it extends substantially the full distance between the spiders 6 and is preferably mounted on a tube 21 which is coextensive with the zinc element. The element 5 is also of square cross-section. The bore 22 of the tube is of such diameter that the pins 18 may be inserted therein whereby the central tube engages said pins to support the sacrificial zinc element in place in the barrel and permits sliding movement of said tube on the pins to accommodate expansion and contraction of the element due to changes in temperature.

The flanges 19 on the spider are preferably spaced from the pin a suitable distance whereby each of said flanges engages the sides of the zinc element and cooperates with the pin 18 in supporting same in the barrel. The zinc element is of less width than the diameter of the disc 11 of the spider. When said scale prevention device is placed in a boiler or the like, as shown in Fig. 1, the disc 11 protects the ends of the zinc element from the washing action of the water as it circulates through the barrel. The tube 21 is preferably of steel to provide a rigid support for the zinc element and to cooperate with the spiders 6 which are preferably formed of brass or other conductors of electricity to complete a circuit between the copper barrel and the zinc element whereby an electrical circuit is set up in which the water having mineral salts therein forms an electrolyte.

In assembling a corrosion scale prevention unit of the character described, a spider is inserted in one end of the barrel 4 and the apertures 14 in the feet of the spider aligned with the apertures 15 in the barrel and rivets 16 or other fastening devices are inserted therein to secure said spider in place. The zinc element and tube are then inserted in the barrel in such a manner that the pin 18 on the spider in the barrel extends into the bore 22 of the tube and the flanges 19 of the spider engage the sides of the zinc element to aid in centering and holding said element in place. The other spider is then inserted in the barrel in such a manner that the pin 18 thereon extends into the other end of the tube 21 and the flanges 19 engage the sides of the zinc element. The apertures 14 in the feet 13 are then aligned with the apertures 15 in the barrel and rivets or other fastening means 16 inserted to secure said spider in place and complete the assembly of the unit. The corrosion or scale prevention unit may then be placed in a boiler or water heater and immersed in the water therein.

In the present instance, the unit is illustrated as being applied to a horizontal type fire tube boiler. However, the operation would be substantially the same in any type of water heater or boiler. In a fire tube type of boiler the unit is preferably placed in position to rest on the uppermost tube 24, substantially at the center of said boiler and extending transversely thereof and suitably secured in position by bands or the like 25. The placing of the unit in this position on the fire tubes submerges it in the water in the boiler.

When the foreign particles or compounds are present in the water, the zinc sacrificial element acts as a negative pole and the copper barrel as a positive pole causing current to flow from the zinc through the electrolyte or water to the barrel and back through the spider members to the tube 21 which is preferably of steel or other conducting material to complete the circuit to the zinc element.

The openings 10 in the barrel are located at the bottom thereof and as the sludge and precipitate settle through the water in the heater or boiler, some particles pass through the openings and settle downwardly to the bottom of the boiler or water heater.

The openings 17, between the legs of the spider, permit free access to the space between the elements and the barrel openings 10 which incre... full free circulation of the unit. This circulation and agitate with some movement in the precipitate at the bottom of the barrel, and as the precipitate moved thereon, additional portions thereof pass through the opening 10 thereby maintain a substantially clean barrel wherein there is no plugging or sealing of the unit which would cause such unit to stop working.

While I have particularly illustrated and described a corrosion and scale prevention device adapted to be placed on the fire tubes of a boiler or the like, it is obvious that the invention is adapted for other uses where water containing solutions of various compounds of lime, sodium, magnesia, sulfate and carbonate, are found, in which there is a possibility of scale or deposits forming on the metal parts of the equipment and that such a scale prevention device may be placed in the tubes of a water tube boiler or supply tubes for any water treating equipment.

What I claim and desire to secure by Letters Patent is:

1. A device of the character described including, a barrel, spiders having legs with flanges on their outer ends attached to the ends of the barrel, said barrel and spiders being of a material conductive of electricity, inwardly extending pins on said spiders in axial alignment with each other, a zinc element in said barrel having a hollow core of harder metal, the ends of said hollow core engaging the pins on said spiders, and flanges on the spiders extending inwardly of the barrel to overlie the exterior faces of the ends of the zinc element to freely support the same, said spiders being spaced apart a distance relative to the length of the zinc element to accommodate for differential in expansion and contraction of the zinc element of the barrel.

2. A scale and corrosion preventing device for submergence within a boiler comprising a barrel member, spiders disposed within and attached to the ends of the barrel, the spiders being conductive of electricity, a bar member extending through said barrel, a tube of harder metal than the bar member extending through said bar member, pins on said spiders extending inwardly and in axial alignment with each other loosely engaging in the ends of said tube to accommodate expansion and contraction of said bar member, and spaced flanges extending inwardly from the spiders to embrace the sides of the ends of the bar, one of said members being electro-positive to the other for setting up an electrical current when the device is in submergence.

UAL J. BROWN.

REFERENCES CITED

The following references are of record in the file of this patent:

UNITED STATES PATENTS

| Number | Name | Date |
| --- | --- | --- |
| 2,058,370 | Thompson | Oct. 20, 1936 |
| 779,326 | Stewart | Jan. 3, 1905 |
| 647,409 | Hudson et al. | Apr. 10, 1910 |
| 64,992 | Matthew | May 21, 1867 |
| 2,204,823 | Rhodes | June 18, 1940 |
| 2,193,667 | Bary | Mar. 12, 1940 |
| 2,328,589 | Walker | Sept. 7, 1943 |
| 2,321,796 | Butler | June 15, 1943 |